United States Patent
Weniger et al.

(10) Patent No.: US 8,175,057 B2
(45) Date of Patent: May 8, 2012

(54) METHOD AND SYSTEM FOR FAST HANDOVERS USING DYNAMIC ROUTER ADVERTISEMENTS

(75) Inventors: Kilian Weniger, Langen (DE); Jens Bachmann, Langen (DE)

(73) Assignee: Panasonic Corporation, Osaka (JP)

(*) Notice: Subject to any disclaimer, the term of this patent is extended or adjusted under 35 U.S.C. 154(b) by 776 days.

(21) Appl. No.: 12/281,758

(22) PCT Filed: Mar. 1, 2007

(86) PCT No.: PCT/EP2007/001782
§ 371 (c)(1),
(2), (4) Date: Dec. 1, 2008

(87) PCT Pub. No.: WO2007/101610
PCT Pub. Date: Sep. 13, 2007

(65) Prior Publication Data
US 2009/0097453 A1 Apr. 16, 2009

(30) Foreign Application Priority Data
Mar. 8, 2006 (EP) .................................. 06004772

(51) Int. Cl.
*H04W 4/00* (2009.01)
(52) U.S. Cl. ........................................ 370/331; 455/436
(58) Field of Classification Search .................. None
See application file for complete search history.

(56) References Cited

U.S. PATENT DOCUMENTS

| | | | |
|---|---|---|---|
| 2003/0165160 A1* | 9/2003 | Minami et al. | 370/466 |
| 2005/0266848 A1* | 12/2005 | Kim | 455/436 |
| 2005/0272481 A1* | 12/2005 | Kim | 455/574 |
| 2006/0029020 A1 | 2/2006 | Jung | |
| 2007/0109997 A1 | 5/2007 | Hong | |

FOREIGN PATENT DOCUMENTS

WO 2005/053187 6/2005

OTHER PUBLICATIONS

International Search Report dated May 22, 2007.
R. Koodli, et al., "Fast Handovers for Mobile IPv6," rfc4068.txt, Jul. 2005, IETF Standard, Internet Engineering Task Force, IETF, CH, XP015041931.

* cited by examiner

*Primary Examiner* — Chirag Shah
*Assistant Examiner* — Otis L Thompson, Jr.
(74) *Attorney, Agent, or Firm* — Dickinson Wright PLLC

(57) ABSTRACT

The invention relates to a method for managing the movement of a mobile node from a first router in a first network to a second router in a second network, wherein the mobile node communicates with a corresponding node. In order to enable seamless communication between the mobile node and the corresponding node, the second router is dynamically configured by the first router to transmit a router advertisement message to the mobile node, the router advertisement message comprising a subnet prefix of an IP address of the mobile node, said subnet prefix belonging to the first network. A layer 3 link change as observed by the mobile node can be postponed and a default router of the mobile node can be changed to the new access router immediately after the layer 2 handover, thus enabling very fast handovers without requiring modifications to the mobile node implementations.

37 Claims, 3 Drawing Sheets

METHOD AND SYSTEM FOR FAST HANDOVERS USING DYNAMIC ROUTER ADVERTISEMENTS

FIELD OF THE INVENTION

The invention relates to a method for managing the movement of a mobile node moving from a first network to a second network, wherein the mobile node communicates with a corresponding node by exchanging data packets, the data packets being routed by a first router and a second router, the first router and second router being associated respectively with the first network and second network. The invention also relates to a corresponding communication system that is adapted to manage the movement of such a mobile node. The method according to the invention is especially applicable to packet-based mobile communication systems for performing fast handovers in Internet Protocol IP-based networks.

BACKGROUND OF THE INVENTION

Communication systems evolve more and more towards an Internet Protocol IP-based network. They consist of many interconnected networks, in which speech and data are transmitted from one terminal to another terminal in pieces, so-called packets. Those packets are routed to the destination by routers in a connection-less manner. Therefore, packets consist of IP header and payload information and the header comprises among other things a source and destination IP address. For scalability reasons an IP network uses a hierarchical addressing scheme. Hence, an IP address does not only identify the corresponding terminal, but additionally contains information about the topological location of the terminal. With additional information provided by routing protocols, routers in the network are able to identify the next router towards a specific destination.

If a mobile terminal, which will be defined by the term Mobile Node (MN) in the present application, moves between subnets, it must change its IP address to a topological correct one because of the hierarchical addressing scheme. However, since connections on higher-layers such as TCP connections are defined with the IP addresses (and ports) of the communicating nodes, the connection breaks if one of the nodes changes its IP address, e.g. due to movement.

An adapted IP protocol has been proposed, referred to by the term Mobile IPv6, that describes an IP-based mobility protocol enabling Mobile Nodes to move between subnets in a manner transparent for higher layers and applications, i.e. without breaking higher-layer connections. Therefore, a Mobile Node has two IP addresses configured: a Care-of-Address (CoA) and a Home Address (HoA). The Mobile Node's higher layers use the Home Address for communication with the communication partner (destination terminal), which will be defined by the term Corresponding Node (CN) in the present application. The Home Address does not change and serves the purpose of identification of the Mobile Node. Topologically, it belongs to the Home Network (HN) of the Mobile Node. In contrast, the Care-of-Address changes on every movement resulting in a subnet change and is used as the locator for the routing infrastructure. Topologically, it belongs to the network the Mobile Node is currently visiting. An Home Agent (HA) located on the home link maintains a mapping of the Mobile Node's Care-of-Address to the Mobile Node's Home Address and redirects incoming traffic for the Mobile Node to its current location.

Mobile IPv6 currently defines two modes of operation: bi-directional tunneling and route optimization. If bi-directional tunneling is used, data packets sent by the Corresponding Node and addressed to the Home Address of the Mobile Node are intercepted by the Home Agent in the Home Network and tunneled to the Care-of-Address of the Mobile Node. Data packets sent by the Mobile Node are reverse tunneled to the Home Agent, which decapsulates the packets and sends them to the Corresponding Node. For this operation, only the Home Agent must be informed about the Care-of-Address of the Mobile Node. Therefore, the Mobile Node sends Binding Update (BU) messages to the Home Agent. These messages are sent over an IPsec security association and thus are authenticated and integrity protected. One drawback of this mode is that if the Mobile Node is far away from the Home Network and the Corresponding Node is close to the Mobile Node, the communication path is unnecessarily long, resulting in inefficient routing and high packet delays.

The route optimization mode can prevent this inefficiency by using the direct path between Corresponding Node and Mobile Node. Therefore, the Mobile Node sends Binding Update messages to the Corresponding Node, which then is able to directly send data packets to the Mobile Node (a type 2 routing header is used to send the packets on the direct path). Of course, the Corresponding Node has to implement Mobile IPv6 route optimization support. To authenticate the BU message, the Mobile Node and the Corresponding Node perform a so-called return routability procedure, which tests the reachability of the Mobile Node at the Home Address and Care-of-Address and generates a shared session key.

A standard Mobile IP handover procedure is illustrated in FIG. 1 and will now be described. A standard Mobile IP handover procedure comprises many steps. First, the Mobile Node needs to detect a new layer 2 link. Then, it can execute the layer 2 handover. After that, it needs to detect the layer 3 link change. In the next step, it has to discover the new layer 3 prefix and the new Access Router (AR) address. Subsequently, it must obtain a new Care-of-Address, possibly using stateless auto-configuration, which also includes a Duplicate Address Detection (DAD) procedure. Then it must send a BU message to the Home Agent and the Corresponding Node before IP packets can finally be delivered to the Mobile Node at the new location.

In standard Mobile IPv6, a layer 3 link change is detected, e.g. when a certain number of Router Advertisement (RA) messages are not received, which are usually sent periodically. A timer can be used to check this condition. Even with the lowest allowed interval of sending RA messages (30 ms) and with a threshold of three missed advertisements, this step takes at least 90 milliseconds. The Duplicate Address Detection procedure is also based on a timer and requires the node to send a Neighbour Solicitation (NS) message containing the tentative address and waiting for a response from a node with the same address. If no response is received after three trials, the address is considered unique. A Mobile IP handover procedure may thus take a long time, which can render the use of delay-sensitive communication applications impossible.

Many optimizations have been proposed to improve the Mobile IP handover delay. For instance, the use of multiple interfaces can significantly reduce the handover delay, since data can be sent and received over the first interface while the handover procedure on the second interface is in progress. This requires multiple interfaces with the same or similar characteristics, such as delay, Quality-of-Service support, etc. However, some terminals are not equipped with multiple such interfaces and the integration of a second interface only for enabling fast handovers may be too expensive.

Another way to reduce handover delay is to increase the frequency with which routers send Router Advertisement messages. This way, the Mobile Node can detect a layer 3 link change more quickly. However, the amount of signalling over the air would increase significantly and the remaining handover delay would still be high.

Another possible way is to multicast data to the current and neighbouring Access Router. However, this only reduces the delay during BU latency and would result in many unnecessary data packets going over the network.

The IETF Detecting Network Attachment Working Group has been working on solutions to quickly detect a layer 3 link change. Solutions are proposed for modified and unmodified routers. The former allows faster handovers than the latter and consists of two parts. First, a Mobile Node sends a Router Solicitation (RS) message immediately after it has completed its layer 2 handover. This requires hints from layer 2. The second part enables the detection of a layer 3 link change based on a single received Router Advertisement. Therefore, this Router Advertisement may contain a complete prefix list, which can be compared with the prefix of a previously received Router Advertisement to decide whether the Mobile Node has changed its layer 3 link. To be able to construct the complete prefix list, every router learns the prefixes from other routers on the link from received Router Advertisement messages. However, a major drawback is that the Router Advertisement messages can get big and signalling overhead over the air can get high, if many different routers and prefixes exist on a link.

To mitigate this problem, two optional mechanisms have been introduced. First, the "landmark" option allows the Mobile Node to ask a router if a certain prefix exists on the link. This is done with the Router Solicitation message. A router then replies with yes or no in a Router Advertisement message. The "single prefix" option prescribes that routers on the same link agree on a certain prefix that is always contained in a Router Advertisement. Hence, at least this prefix should be different from a Router Advertisement sent by a router on a different link. The time for layer 3 link change detection, new Access Router discovery, layer 3 prefix discovery, and Duplicate Address Detection can be significantly reduced. However, the time for layer 2 handover, Care-of-Address construction and Binding Update latency remains and packet loss may occur during this time. Also, the layer 3 link detection is not zero, since the Mobile Node needs to send a Router Solicitation before receiving a Router Advertisement.

Another approach is followed by the IETF Network-based Localized Mobility Management (NETLMM) Working Group. The idea is to let the network, i.e. the Access Routers, handle the mobility transparently for the Mobile Node. Hence, the Mobile Node does not detect layer 3 link changes and does not need to change its IP address. This saves the delay of layer 3 link change detection (assuming the existence of layer 2 triggers), new Access Router discovery, new Care-of-Address construction, layer 3 prefix discovery, and Duplicate Address Detection. Binding Update latency is reduced by introducing a local mobility agent, the so-called Mobility Anchor Point (MAP). However, those benefits are only obtained for handovers within a limited area, referred to as the NETLMM domain, which might be a part of an operator's network domain. Packet loss may still occur during layer 2 handover and all the benefits are only obtained as long as the Mobile Node does not leave the NETLMM domain.

In [R. Koodli, "Fast Handovers for Mobile IPv6", IETF RFC 4068, July 2005], multiple methods for fast handovers are specified. First, a Mobile Node can obtain a prefix and IP address of the new Access Router before starting the layer 2 handover. This anticipation is achieved by allowing the Mobile Node to send a Proxy Router Solicitation message to the old Access Router, which contains the layer 2 address of the new Access Router, i.e., handover prediction is required. The network can then determine the new Access Router address and prefix and inform the Mobile Node about it. Hence, the Mobile Node can construct the new Care-of-Address while still being at the old link.

In the so-called predictive mode, the Mobile Node sends a Fast Binding Update to the Access Router on the old link. This Access Router then communicates with the new Access Router to check uniqueness of the new Care-of-Address and to setup a tunnel for forwarding the Mobile Node's traffic. While the Mobile Node is in the process of layer 2 handover, the new Access Router can buffer incoming packets and when the Mobile Node has completed the layer 2 handover, the new Access Router can immediately deliver packets to the Mobile Node. In the so-called reactive mode, the Fast Binding Update is sent after the layer 2 handover on the new link. Hence, Duplicate Address Detection and tunnel establishment is happening after the Mobile Node has completed the layer 2 handover.

In the predictive mode, packet loss can be prevented and packets can be delivered to the Mobile Node immediately after completing the layer 2 handover. However, a problem exists if there is not enough time before the layer 2 handover to send the Fast Binding Update message. In this case, only the reactive mode can be used. However, the reactive mode can result in significant handover latency, since Duplicate Address Detection and tunnel establishment happen in the critical phase after the layer 2 handover. Moreover, if there is not enough time to send Proxy Router Solicitation messages before the layer 2 handover or if the prediction was wrong, i.e. the Mobile Node hands over to another Access Router, none of these methods can be used. Another drawback is the high amount of signaling over the air involved.

U.S. Pat. No. 6,978,137 proposes a method for handover prediction, in which both Mobile Node and network send the output of their handoff prediction to a central server, which triggers handoff if both predictions match. This method can be used in anticipated handover methods, but cannot reduce handover latency by itself.

WO2005053187 describes a method for fast handovers that shifts the layer 3 link change, Duplicate Address Detection and Care-of-Address generation functionality from the Mobile Node to the Access Router. After a link layer handover, a Mobile Node sends a modified Router Solicitation message to the Access Router, which can then detect a layer 3 handover, generate a Care-of-Address, perform Duplicate Address Detection and transmit this Care-of-Address to the Mobile Node in a modified Router Advertisement message. However, this method requires modifications to the Mobile Node and Access Router implementations. Furthermore, it does not eliminate handover latency, since a round trip time to the Access Router is required for the Router Solicitation/Router Advertisement exchange and the Binding Update transmission latency remains.

SUMMARY OF THE INVENTION

The object of the present invention is to suggest a method for managing the movement of a mobile node moving from a first network to a second network that enables seamless communication between the mobile node and a corresponding node.

The object is solved by the subject matter of the independent claims. Advantageous embodiments of the invention are subject matter of the dependent claims.

One aspect of the invention is to render a fast seamless mobile IP handover possible, wherein a layer 3 handover latency is close to zero. Another aspect of the invention is directed to a method that, unlike the systems mentioned in the background of invention section, achieves a layer 3 handover latency close to zero in situations where a handover cannot be predicted, i.e. neither the new point of attachment nor the exact time of handover can be predicted. This method thus does not require layer 3 signalling before the layer 2 handover.

Further, according to another aspect of the invention, the method is applicable to global mobility management, i.e. is not restricted to a certain movement area. Moreover, the number of different entities which have to be modified to support the invention is minimized, thereby enabling an easy large scale deployment.

According to a first important aspect of the invention, the layer 3 link change as observed by the Mobile Node is postponed by dynamically configuring the new Access Router to advertise the old subnet prefix to the Mobile Node. This prefix advertisement may be done using Router Advertisements. The network can control when the layer 3 handover shall be executed by setting a prefix lifetime field in a Router Advertisement message accordingly.

According to a second important aspect of the invention, the network detects the layer 2 handover, and an Internet Control Message Protocol (ICMP) redirect message sent by the new Access Router on behalf of the old Access Router forces the Mobile Node to change the default router to the new Access Router immediately after the layer 2 handover. In order to do so, the old Access Router informs the new Access Router about the Mobile Node's layer 2 address, the old subnet prefix, and the old Access Router's link-local address. The mechanisms according to the first and second important aspect of the invention, when used in combination, enable a very fast handover without requiring modifications to the Mobile Node implementations.

According to a third important aspect of the invention, a tunnel between old and new Access Router can be established to enable the Mobile Node to send and receive IP data for a limited amount of time with the old Care-of-Address at the new link and in parallel to the postponed layer 3 handover, thus ensuring zero packet loss. Furthermore, the old Access Router can forward data to all or only a subset of neighbouring Access Routers during the time of the Mobile Node's layer 2 handover, so as to prevent the need for any handover prediction.

One embodiment of the invention provides a method for managing the movement of a mobile node moving from a first network to a second network, wherein the mobile node communicates with a corresponding node by exchanging data packets, the data packets being routed by a first router and a second router, the first router and second router being associated respectively with the first network and second network, said mobile node has a first IP address configured with a subnet prefix belonging to the first network. The method comprises receiving, by the first router, first information on a departure of the mobile node from the first network, setting, by the first router, upon information reception, a first forwarding rule according to which data packets addressed to the first IP address of the mobile node are to be forwarded to at least one neighbouring router of the first router, the at least one neighbouring router being located in at least one neighbouring network of the first network, and transmitting, by the first router, the subnet prefix of the first IP address of the mobile node to the at least one neighbouring router. The method further comprises receiving, by the second router, second information on an arrival of the mobile node in the second network, setting, by the second router, upon arrival of the mobile node in the second network, a second forwarding rule according to which data packets addressed to the first IP address of the mobile node and arriving at the second router are to be delivered to the mobile node over a wireless network interface of the second router, and transmitting, by the second router, a router advertisement message over the wireless network interface to the mobile node, the router advertisement message comprising the subnet prefix of the first IP address.

In a further embodiment of the invention, the method comprises setting, by the second router, a prefix lifetime to a value that is larger than a minimum time necessary for the mobile node to complete a configuration of a second IP address having a subnet prefix belonging to the second network, and transmitting the set prefix lifetime in the router advertisement message. The method further comprises configuring, by the mobile node, a second IP address while being located in the second network and receiving data packets addressed to the first IP address, and registering, by the mobile node, the configured second IP address at a mobility agent.

According to an alternative embodiment of the invention, the method comprises setting, by the second router, a prefix lifetime to a value that is at least as high as a transmission interval between two consecutive router advertisement messages, and periodically transmitting, by the second router, the router advertisement message to the mobile node, the router advertisement message comprising the set prefix lifetime. According to an improved embodiment of the invention, the mobile node moves successively from a previous network to a current network, a previous router and a current router being associated respectively with the previous network and current network, and said method further comprises transmitting, by the previous router, the subnet prefix of the first IP address to the current router.

According to a particularly advantageous embodiment of the invention, the method further comprises notifying, by the second router, the first router about the arrival of the mobile node in the second network, and updating, by the first router, upon notification from the second router, the first forwarding rule with a third forwarding rule according to which data packets addressed to the first IP address of the mobile node and arriving at the first router are to be forwarded to the second router.

In another embodiment of the invention, the method further comprises storing, by the at least one neighbouring router, data packets addressed to the first IP address of the mobile node, and transmitting, by the second router, the stored data packets to the mobile node over the wireless network interface according to the set second forwarding rule.

According to another aspect of the invention, a method for managing the movement of a mobile node moving from a first network to a second network, wherein the mobile node communicates with a corresponding node by exchanging data packets, the data packets being routed by a first router and a second router, the first router and second router being associated respectively with the first network and second network, and said mobile node has a first IP address configured with a subnet prefix belonging to the first network, is provided. The method comprises receiving, by the first router, first information on a departure of the mobile node from the first network, transmitting, by the first router, the subnet prefix of the first IP address of the mobile node to at least one neighbouring router of the first router, the at least one neighbouring router being located in at least one neighbouring network of the first network, receiving, by the second router, second information on an arrival of the mobile node in the second network, transmitting, by the second router, upon arrival of the mobile node in the second network, an indication to the mobile node to use the second router as a default router, setting, by the second router, a forwarding rule according to which data packets sent by the mobile node over a wireless network interface and arriving at the second router are to be transmitted to the first router, and transmitting, by the second router, a router advertisement message over the wireless network interface to the mobile node, the router advertisement message comprising the subnet prefix of the first IP address.

In a further embodiment of the invention, the method comprises setting, by the second router, a prefix lifetime to a value that is larger than a minimum time necessary for the mobile node to complete a configuration of a second IP address having a subnet prefix belonging to the second network, and transmitting the set prefix lifetime in the router advertisement message. The method further comprises configuring, by the mobile node, a second IP address while being located in the second network and sending data packets addressed to the first IP address, and registering, by the mobile node, the configured second IP address at a mobility agent.

According to an alternative embodiment of the invention, the method comprises setting, by the second router, a prefix lifetime to a value that is at least as high as a transmission interval between two consecutive router advertisement messages, and periodically transmitting, by the second router, the router advertisement message to the mobile node, the router advertisement message comprising the set prefix lifetime. According to an improved embodiment of the invention, the mobile node moves successively from a previous network to a current network, a previous router and a current router being associated respectively with the previous network and current network, and said method further comprises transmitting, by the previous router, the subnet prefix of the first IP address to the current router.

According to another embodiment of the invention, the method further comprises transmitting, by the first router, a layer 2 address of the mobile node to the at least one neighbouring router, and wherein the step of receiving first information on the departure of the mobile node from the first network comprises receiving, by the first router, information on the mobile node starting a layer 2 handover for the transmitted layer 2 address of the mobile node, and the step of receiving second information on the arrival of the mobile node in the second network comprises receiving, by the second router, information on the mobile node terminating the layer 2 handover for the transmitted layer 2 address of the mobile node.

According to yet another embodiment of the invention, the method further comprises transmitting, by the second router, upon arrival of the mobile node in the second network, a redirect message to the mobile node comprising an IP address of the second router and an indication for the mobile node to send data packets over the second router (AR2).

According to an improved embodiment of the invention, the method further comprises transmitting, by the first router, an IP address of the first router to the second router, and the redirect message transmitted to the mobile node further comprises the IP address of the second router as a target address and the received IP address of the first router as a source address, the mobile node thereby updating, upon reception of the redirect message, a default router from the first router to the second router.

According to yet another improved embodiment of the invention, the method further comprises transmitting, by the second router, the redirect message to the mobile node upon receiving, by the second router, data packets sent by the mobile node that are addressed to the IP address of the first router.

A further embodiment of the invention provides a communication system comprising a first router, a second router and a mobile node, the first router and second router being associated respectively with a first network and a second network, wherein said communication system is adapted to manage the movement of the mobile node moving from the first network to the second network, the first router and the second router are adapted to route data packets exchanged by the mobile node with a corresponding node, and said mobile node has a first IP address configured with a subnet prefix belonging to the first network. The first router comprises a first receiving section for receiving first information on a departure of the mobile node from the first network, a first forwarding rule setting section for setting, upon information reception, a first forwarding rule according to which data packets addressed to the first IP address of the mobile node are to be forwarded to at least one neighbouring router of the first router, the at least one neighbouring router being located in at least one neighbouring network of the first network, and a first transmitting section for transmitting the subnet prefix of the first IP address of the mobile node to the at least one neighbouring router. The second router comprises a second receiving section for receiving second information on an arrival of the mobile node in the second network, a second forwarding rule setting section for setting, upon arrival of the mobile node in the second network, a second forwarding rule according to which data packets addressed to the first IP address of the mobile node and arriving at the second router are to be delivered to the mobile node over a wireless network interface of the second router, and a second transmitting section, for transmitting a router advertisement message over the wireless network interface to the mobile node, the router advertisement message comprising the subnet prefix of the first IP address.

Another embodiment of the invention provides an alternative communication system comprising a first router, a second router and a mobile node, the first router and second router being associated respectively with a first network and a second network, wherein said communication system is adapted to manage the movement of the mobile node moving from the first network to the second network, the first router and the second router are adapted to route data packets exchanged by the mobile node with a corresponding node, and said mobile node has a first IP address configured with a subnet prefix belonging to the first network. The first router comprises a first receiving section for receiving first information on a departure of the mobile node from the first network, a first transmitting section for transmitting the subnet prefix of the first IP address of the mobile node to at least one neighbouring router of the first router, the at least one neighbouring router being located in at least one neighbouring network of the first network, and the second router comprises a second receiving section for receiving second information on an arrival of the mobile node in the second network, a second forwarding rule setting section for setting, upon arrival of the mobile node in the second network, a forwarding rule according to which data packets sent by the mobile node over a wireless network interface and arriving at the second router are to be transmitted to the first router, and a second transmitting section for transmitting, upon arrival of the mobile node in the second network, an indication to the mobile node to use the second router as a default router, and transmitting a router advertisement message over the wireless network interface to the mobile node, the router advertisement message comprising the subnet prefix of the first IP address.

Both communication systems above may comprise further means adapted to perform the method for managing the movement of a mobile node moving from a first network to a second network according to one of the various embodiments of the invention and variations described above.

DETAILED DESCRIPTION OF THE INVENTION

The following paragraphs will describe various embodiments of the invention. Two embodiments of the invention will be described in particular detail that relate to a method for managing the movement of a mobile node moving from a first network to a second network. In the first embodiment, a mobile node's IP address configured with a subnet prefix belonging to the first network is changed, whereas, in the second embodiment, a mobile node's IP address configured with a subnet prefix belonging to the first network remains unchanged.

It is assumed that Access Routers within a network receive "layer 2 link-down" and "layer 2 link-up" events when the Mobile Node's layer 2 handover has started and ended, respectively. Since usually only layer 2 entities, such as e.g. Access Points, can detect such events, additional signalling between directly connected Access Points and Access Routers may be necessary or, alternatively, Access Routers and Access Points must be co-located. This additional signalling is considered obvious for a person skilled in the art. It is further assumed that an Access Router knows the addresses of all of its neighbouring Access Routers. Prior art mechanisms can be used to achieve this, such as e.g. pre-configuration or dynamical neighbourhood discovery.

In the following, a fast handover with a change of a mobile node's IP address configured with a subnet prefix belonging to the first network will be described.

Figure 1:
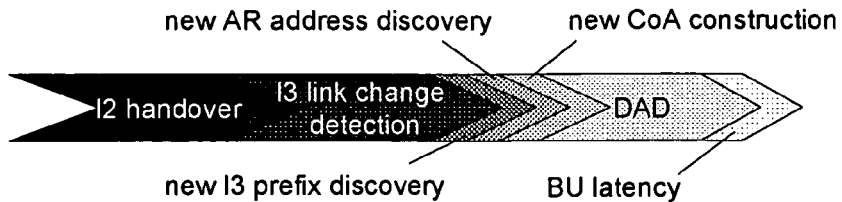
FIG. 1 shows the steps of a standard Mobile IP handover.
Figure 2:
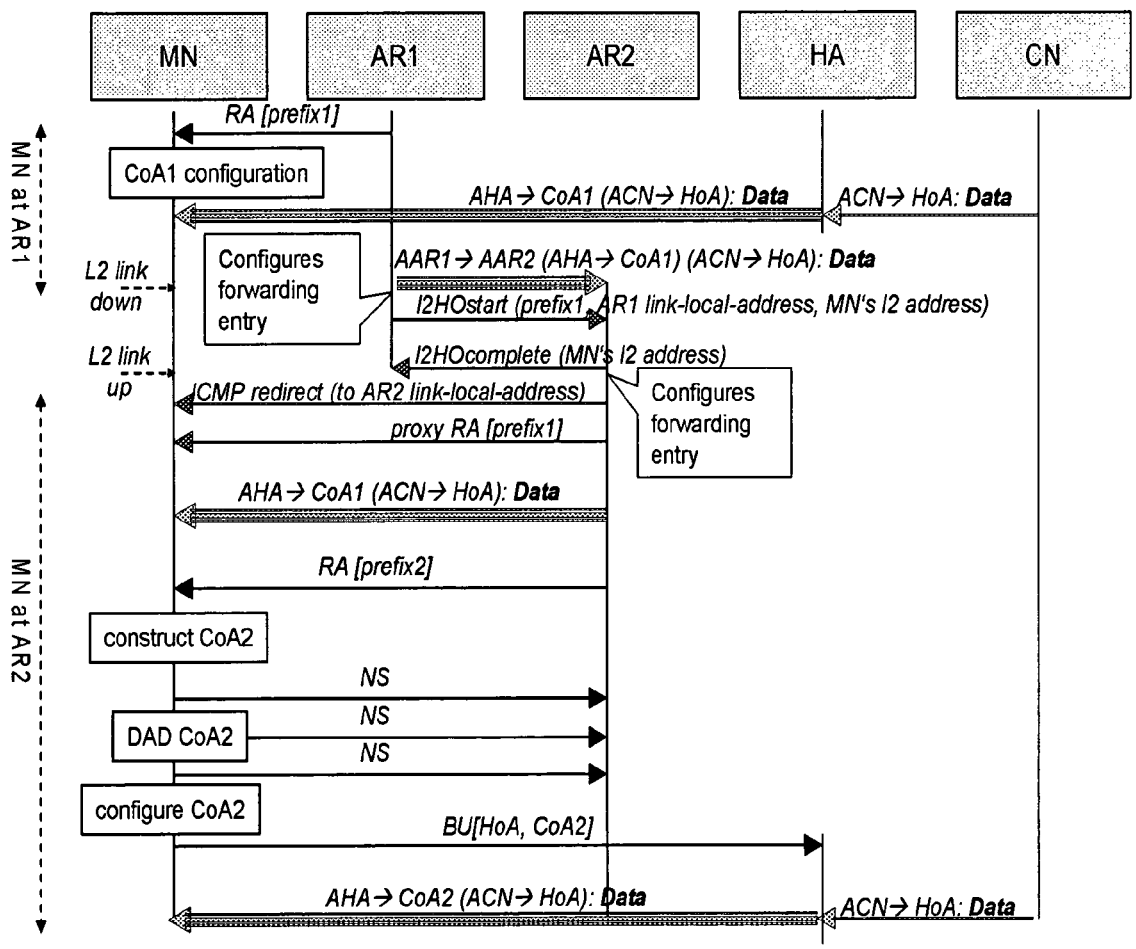
FIG. 2 shows a procedure for performing a Mobile IPv6 fast handover with dynamic Proxy Router Advertisements and postponed Care-of-Address change according to an embodiment of the invention.

The general procedure of this embodiment is illustrated in FIG. 2 and will be explained in the following. Access Points are not shown in the figures for clarity. A mobile node MN moves from a first network to a second network, wherein a first router AR1 and a second router AR2 are associated respectively with the first network and second network. The mobile node MN communicates with a corresponding node CN by exchanging data packets, the data packets being routed by the first router AR1 and second router AR2. At the start of the procedure, the Mobile Node MN is attached to the Access Router AR1 and has configured a first IP address CoA1 with a subnet prefix matching one of the prefixes of the Access Router AR1, which will be referred to as prefix1. If a Mobile IPv6 protocol is used, the first IP address CoA1 is registered with the Mobile Node's Home Agent HA and data packets are sent and received using bi-directional tunneling.

Even though the first IP address CoA1 has been described above to be configured with the Home Agent HA when using bi-directional tunneling, the Mobile Node MN can also have its first IP address CoA1 registered with the Corresponding Node CN when using route optimisation. Another IP-based mobility management protocol can also be used without any effect on the invention.

When the Access Router AR1 receives a "Layer2 link-down" event, it configures a first forwarding entry for the first IP address CoA1 of the Mobile Node MN in its forwarding table and starts forwarding all data packets received for the first IP address CoA1 of the Mobile Node MN to all or a subset of neighbouring Access Routers, which temporarily store incoming data packets. The Access Router AR1 further notifies the neighbouring Access Routers about the layer 2 handover of the Mobile Node. Therefore, it sends a "layer 2 handover start (l2HOstart)" message containing the layer 2 address of the mobile node MN, the subnet prefix corresponding to the first IP address CoA1 of the mobile node MN (prefix1), and the link-local address of Access Router AR1, configured on the wireless network interface of Access Router AR1 to which the Mobile Node MN is attached.

When the Mobile Node MN has completed the layer 2 handover, the second Access Router AR2 receives a "Layer2 link-up" event for the layer 2 address of the mobile MN. Subsequently, the second Access Router AR2 notifies the first Access Router AR1 about the Mobile Node MN having completed the layer 2 handover by using a "layer 2 handover complete (l2HOcomplete)" message. The Mobile Node MN identifier contained in the "l2HOcomplete" message is preferentially the layer 2 address of the mobile node MN. Alternatively, the first IP address CoA1 of the mobile node MN could be used as an identifier of the mobile node MN.

Upon receiving the "l2HOcomplete" message, the first Access Router AR1 changes the first forwarding rule for packets addressed to the first IP address CoA1 of the mobile node MN. It sets a new forwarding rule, according to which the data packets, instead of being forwarded to all or a subset of the neighbouring Access Routers, are forwarded only to the second Access Router AR2.

Figure 5:
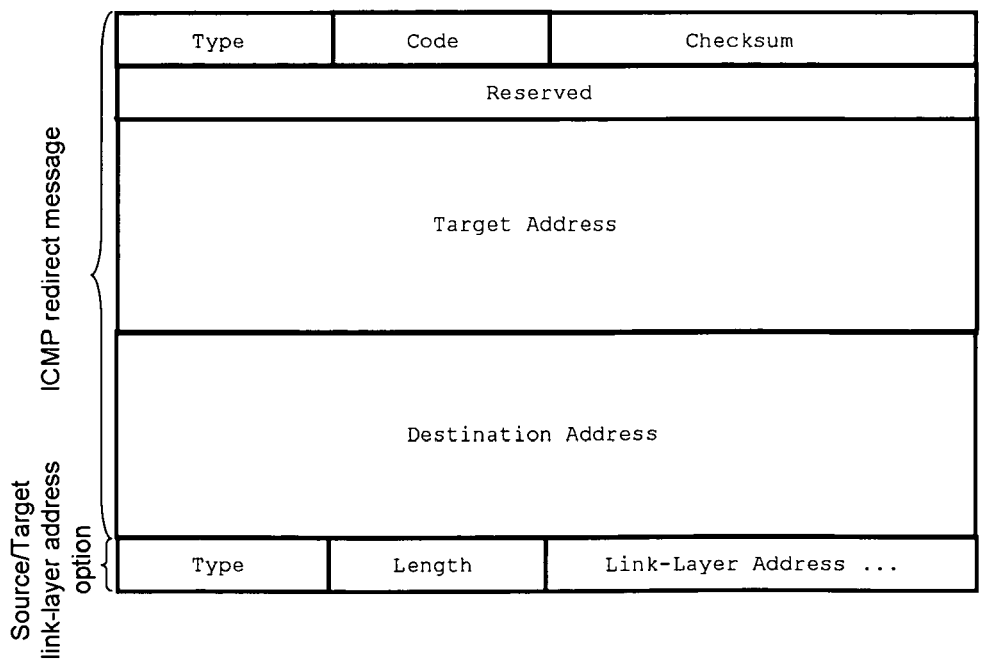
FIG. 5 shows an ICMP Redirect Message with Source/Target Link-Layer Address option.

Next, the second Access Router AR2 sends an ICMP redirect message to the Mobile Node MN, so that the Mobile Node MN can quickly change its default router to be able to send data packets on the uplink. The format of a redirect message is shown in FIG. 5. According to an embodiment of the invention, some protocol fields of the redirect message are set to specific values. The link-local IP address of the first Access Router AR1 is set as source address in the IP header, the first IP address CoA1 of the mobile node as destination address in the IP header, the link-local IP address of the second Access Router AR2 as target address in the ICMP header, and the link-local IP address of the first Access Router AR1 as destination address in the ICMP header. It may optionally contain the layer 2 address of the second access router AR2 in the target link-layer address option.

The destination address in the ICMP header indicates for which data packets, i.e. which destinations/Correspondent nodes, the redirect applies. To avoid having to send a redirect message for every single new destination address in the IP header of data packets sent by the Mobile Node MN, the first redirect message should redirect all data packets sent by the Mobile Node MN. According to a preferred embodiment of the invention, the default router of the Mobile Node MN is redirected upon reception of the redirect message. Hence, when the mobile node MN receives the redirect message from the second router AR2, the mobile node MN updates its default router from the first router AR1 to the second router AR2.

According to another possible implementation, the destination address in the ICMP header may be set to a well-known address representing any address, or multiple redirect messages may be sent, each with the IP address of the correspondent node CN as destination address in the ICMP header. In both implementations, the Mobile Node MN changes the corresponding Destination Cache entries accordingly on receipt of the redirect message.

According to another embodiment of the invention, the redirect message can be re-transmitted, when packets addressed to the layer 2 address or link-local IP address of the first Access Router AR1 are received, in order to consider packet loss of the first redirect message. However, this may require the wireless network interface of the second Access Router AR2 to be in promiscuous mode, which requires additional computing resources on the second Access Router AR2.

In the next step of the procedure shown in FIG. 2, the second Access Router AR2 configures a forwarding entry for the first IP address CoA1 of the mobile node MN, according to which all data packets are to be delivered to the Mobile Node MN on the wireless link. The second Access Router AR2 then immediately starts delivering all stored and incoming packets addressed to the first IP address CoA1 of the Mobile Node MN to the mobile node MN on the wireless link.

The IP packets on the uplink, i.e. data packets sent by the Mobile Node MN with the first IP address CoA1 as source address and received at the second Access Router AR2, are forwarded to the first Access Router AR1, and from there are normally routed in the fixed network. These reverse tunneling entries can be created at the same time the forwarding entries are created. The reverse tunneling is only needed if ingress filtering must be supported, which is network operator dependent.

In the next step of the procedure, the second access router AR2 sends a Router Advertisement RA message to the Mobile Node MN, which contains the prefix of the first Access Router AR1 (prefix1). This message can be sent as a response to a Router Solicitation sent by the Mobile Node MN or in an unsolicited manner. On receipt of the Router Advertisement RA message containing the prefix of the first Access Router AR1 (prefix 1), the Mobile Node MN thinks it is still located at the same layer 3 link than before the layer 2 handover and, hence, does not trigger the layer 3 handover procedure, such as e.g. sending a Mobile IPv6 Binding Update message. Consequently, the Mobile Node MN is able to receive and send IP packets at the second Access Router AR2 immediately after completing the layer 2 handover and without performing a layer 3 handover.

In the next step of the procedure shown in FIG. 2, the second Access Router AR2 sends a Router Advertisement RA containing the subnet prefix of the second access router AR2 (prefix2) to the mobile node MN. Upon receiving a Router Advertisement RA at the second Access Router AR2 with the subnet prefix of the second access router AR2 (prefix2), the Mobile Node MN constructs a second IP address CoA2, performs Duplicate Address Detection DAD, which may include sending 3 Neighbour Solicitation messages NS, configures the new IP address CoA2, and registers this address at its Home Agent HA.

Since the steps of constructing the second IP address CoA2, performing DAD, configuring the new IP address CoA2, and registering it at the Home Agent HA can all be done in parallel to receiving and sending IP packets with the first IP address CoA1, the individual latencies involved by these steps do not contribute to the handover latency, thus allowing to obtain a layer 3 latency close to zero.

Figure 4:
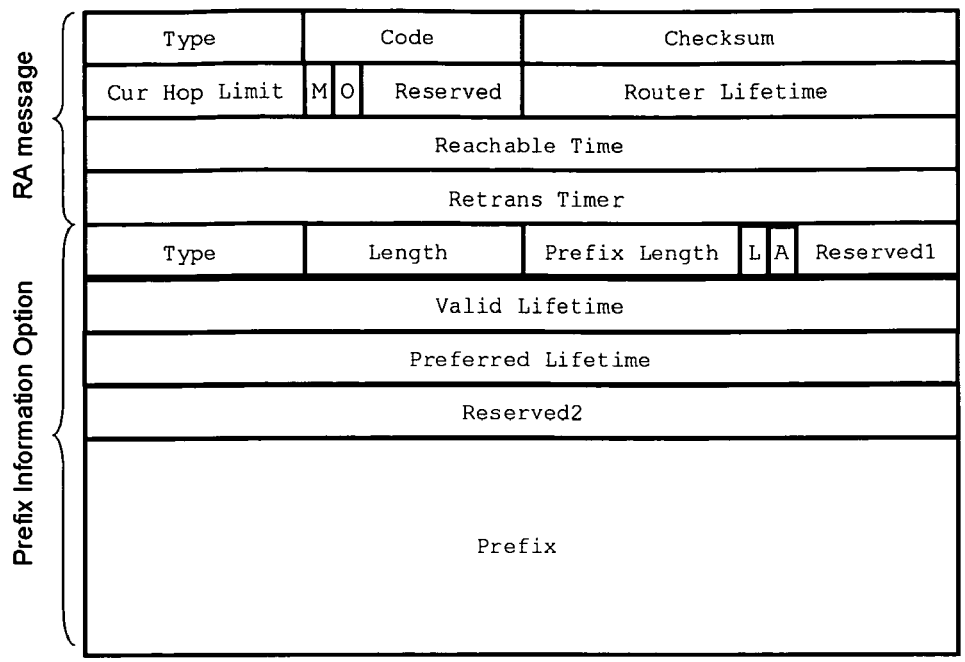
FIG. 4 shows a Router Advertisement message with Prefix Information option.

The network can control when the Mobile Node MN shall register the newly configured second IP address CoA2 as its new IP address by setting the lifetime fields referred to as "valid lifetime" and "preferred lifetime" in the prefix information option of the Router Advertisement RA message sent by the second Access Router AR2 appropriately. These lifetime fields are shown in FIG. 4, which shows the structure of a Router Advertisement RA message.

If the preferred lifetime of the prefix of the first Access Router AR1 (prefix1) expires, the Mobile Node MN uses another address, such as e.g. the second IP address CoA2, and may not use the first IP address CoA1 anymore for new packet flows/connections. However, the mobile node MN may still use the first IP address CoA1 for ongoing packet flows/connections. If the valid lifetime of the prefix of the first Access Router AR1 (prefix1) expires, the Mobile Node MN may not use the first IP address CoA1 anymore. It then must use another IP address, such as e.g. the second IP address CoA2 for new packet flows/connections as well as for ongoing packet flows/connections.

According to a preferred embodiment of the invention, the second Access Router AR2 sends a Router Advertisement RA message containing the first subnet prefix (prefix1) with a long enough lifetime value in the prefix information option to the Mobile node MN, i.e. the prefix lifetime is set to a value that is larger than a minimum time necessary for the mobile node MN to complete a configuration of the second IP address CoA2. The Mobile Node MN thus thinks it is still located at the old layer 3 link, as long as the first prefix (prefix 1) has not expired. When the preferred lifetime of the first prefix (prefix1) is expired, the Mobile Node MN registers the second IP address CoA2 at the Home Agent HA of the Mobile Node MN, and at the Corresponding Node CN, and can then send and receive data packets at the second IP address CoA2. Subsequently, the second Access Router AR2 does not need to send a Router Advertisement message anymore. Therefore, a layer 3 handover delay of zero is possible when using the described procedure. In order to prevent packet loss, the valid lifetime of the first IP address CoA1 should first be expired after the Binding Acknowledgement BA message has been received by the Mobile Node MN.

In the following, a fast handover without changing a mobile node's IP address configured with a subnet prefix belonging to the first network will be described.

Figure 3:
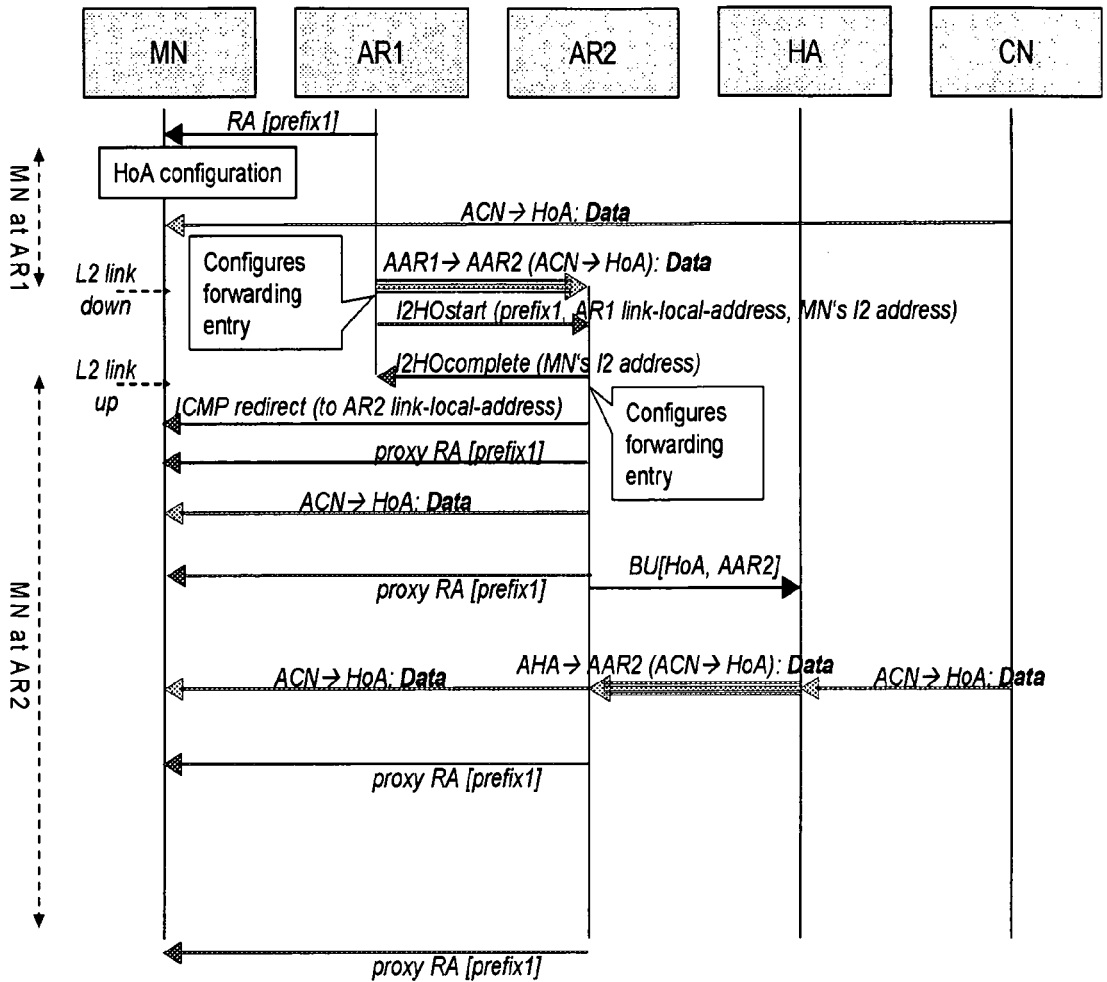
FIG. 3 shows a procedure for performing a Mobile IPv6 fast handover with dynamic Proxy Router Advertisements and without Care-of-Address change according to another embodiment of the invention.

The general procedure of this embodiment is illustrated in FIG. 3 and will be explained in the following. The principle of this embodiment of the invention relies in that the Mobile Node MN is forced to keep its first IP address CoA1 and never perform a layer 3 handover. To do so, the second Access Router AR2 keeps sending Router Advertisement RA messages for the first prefix (prefix1) with a non-zero lifetime. In case of multiple consecutive handovers to further Access Routers, that are located in networks to which the Mobile Node MN may move after visiting the second network, the first prefix of the first network (prefix1) is passed on to these multiple Access Routers. The aspect of never performing a layer 3 handover from a mobile node's point of view is similar to the NETLMM approach, however with the significant difference that the area, in which the Mobile Node MN may move without changing its IP address, is not limited. A further difference is that the old Access Router can stop sending Router Advertisement RA messages for the old prefix once the Mobile Node MN has left the link of the old Access Router (e.g., as indicated by the "link-down" event).

The general procedure of this embodiment, illustrated in FIG. 3, will now be explained in the following. Access Points are not shown in the figures for clarity. A mobile node MN moves from a first network to a second network, wherein a first router AR1 and a second router AR2 are associated respectively with the first network and second network. The mobile node MN communicates with a corresponding node CN by exchanging data packets, the data packets being routed by the first router AR1 and second router AR2. At the start of the procedure, the Mobile Node MN is attached to the Access Router AR1 and has configured a first IP address CoA1 with a subnet prefix matching one of the prefixes of the Access Router AR1, which will be referred to as prefix1. If a Mobile IPv6 protocol is used, the first IP address CoA1 is registered with the Mobile Node's Home Agent HA and data packets are sent and received using bi-directional tunneling.

Even though the first IP address CoA1 has been described above to be configured with the Home Agent HA when using bi-directional tunneling, the Mobile Node MN can also have its first IP address CoA1 registered with the Corresponding Node CN when using route optimisation. Another IP-based mobility management protocol can also be used without any effect on the invention. Further, as shown in FIG. 3, the first Access Router AR1 may also be the home link of the Mobile Node MN and the first IP address the Home Address HoA of the Mobile Node MN. In this case data packets are sent and received without tunneling over the Home Agent HA.

When the Access Router AR1 receives a "Layer2 linkdown" event, it configures a first forwarding entry for the first IP address CoA1 of the Mobile Node MN in its forwarding table and starts forwarding all data packets received for the first IP address CoA1 of the Mobile Node MN to all or a subset of neighbouring Access Routers, which temporarily store incoming data packets. The Access Router AR1 further notifies the neighbouring Access Routers about the layer 2 handover of the Mobile Node. Therefore, it sends a "layer 2 handover start (l2HOstart)" message containing the layer 2 address of the mobile node MN, the subnet prefix corresponding to the first IP address CoA1 of the mobile node MN (prefix1), and the link-local address of Access Router AR1, configured on the wireless network interface of Access Router AR1 to which the Mobile Node MN is attached.

When the Mobile Node MN has completed the layer 2 handover, the second Access Router AR2 receives a "Layer2 link-up" event for the layer 2 address of the mobile MN. Subsequently, the second Access Router AR2 notifies the first Access Router AR1 about the Mobile Node MN having completed the layer 2 handover by using a "layer 2 handover complete (l2HOcomplete)" message. The Mobile Node MN identifier contained in the "l2HOcomplete" message is preferentially the layer 2 address of the mobile node MN. Alternatively, the first IP address CoA1 of the mobile node MN could be used as an identifier of the mobile node MN.

Upon receiving the "l2HOcomplete" message, the first Access Router AR1 changes the first forwarding rule for packets addressed to the first IP address CoA1 of the mobile node MN. It sets a new forwarding rule, according to which the data packets, instead of being forwarded to all or a subset of the neighbouring Access Routers, are forwarded only to the second Access Router AR2.

Next, the second Access Router AR2 sends an ICMP redirect message to the Mobile Node MN, so that the Mobile Node MN can quickly change its default router to be able to send data packets on the uplink. The format of a redirect message is shown in FIG. 5. According to an embodiment of the invention, some protocol fields of the redirect message are set to specific values. The link-local IP address of the first Access Router AR1 is set as source address in the IP header, the first IP address CoA1 of the mobile node as destination address in the IP header, the link-local IP address of the second Access Router AR2 as target address in the ICMP header, and the link-local IP address of the first Access Router AR1 as destination address in the ICMP header. It may optionally contain the layer 2 address of the second access router AR2 in the target link-layer address option.

The destination address in the ICMP header indicates for which data packets, i.e. which destinations/Correspondent nodes, the redirect applies. To avoid having to send a redirect message for every single new destination address in the IP header of data packets sent by the Mobile Node MN, the first redirect message should redirect all data packets sent by the Mobile Node MN. According to a preferred embodiment of the invention, the default router of the Mobile Node MN is redirected upon reception of the redirect message. Hence, when the mobile node MN receives the redirect message from the second router AR2, the mobile node MN updates its default router from the first router AR1 to the second router AR2.

According to another possible implementation, the destination address in the ICMP header may be set to a wellknown address representing any address, or multiple redirect messages may be sent, each with the IP address of the correspondent node CN as destination address in the ICMP header. In both implementations, the Mobile Node MN changes the corresponding Destination Cache entries accordingly on receipt of the redirect message.

According to another embodiment of the invention, the redirect message can be re-transmitted, when packets addressed to the layer 2 address or link-local IP address of the first Access Router AR1 are received, in order to consider packet loss of the first redirect message. However, this may require the wireless network interface of the second Access Router AR2 to be in promiscuous mode, which requires additional computing resources on the second Access Router AR2.

In the next step of the procedure shown in FIG. 3, the second Access Router AR2 configures a forwarding entry for the first IP address CoA1 of the mobile node MN, according to which all data packets are to be delivered to the Mobile Node MN on the wireless link. The second Access Router AR2 then immediately starts delivering all stored and incoming packets addressed to the first IP address CoA1 of the Mobile Node MN to the mobile node MN on the wireless link.

The IP packets on the uplink, i.e. data packets sent by the Mobile Node MN with the first IP address CoA1 as source address and received at the second Access Router AR2, are forwarded to the first Access Router AR1, and from there are normally routed in the fixed network. These reverse tunneling entries can be created at the same time the forwarding entries are created. The reverse tunneling is only needed if ingress filtering must be supported, which is network operator dependent.

In the next step of the procedure, the second access router AR2 sends a Router Advertisement RA message to the Mobile Node MN, which contains the prefix of the first Access Router AR1 (prefix1). This message can be sent as a response to a Router Solicitation sent by the Mobile Node MN or in an unsolicited manner. On receipt of the Router Advertisement RA message containing the prefix of the first Access Router AR1 (prefix 1), the Mobile Node MN thinks it is still located at the same layer 3 link than before the layer 2 handover and, hence, does not trigger the layer 3 handover procedure, such as e.g. sending a Mobile IPv6 Binding Update message. Consequently, the Mobile Node MN is able to receive and send IP packets at the second Access Router AR2 immediately after completing the layer 2 handover and without performing a layer 3 handover.

In the next step of the procedure shown in FIG. 3, in contrast to the procedure shown in FIG. 2, the second Access Router AR2 keeps sending Router Advertisement RA messages with the prefix of the first Access Router AR1 (prefix1) having a lifetime value set high enough, so that the Mobile Node MN keeps sending and receiving packets using its first IP address CoA1 and does not change to a new IP address CoA2. According to a preferred embodiment of the invention, the prefix lifetime of the first Access Router AR1 (prefix1) is set by the second Access Router AR2 to a value that is at least as high as a transmission interval between two consecutive Router Advertisement messages RA, and the Router Advertisement messages RA are periodically transmitted by the second Access Router AR2 to the Mobile Node MN.

The communication between the Mobile Node MN and other nodes is either continuously carried out over the tunnel to the first Access Router AR1, which may be the Access Router in the home network, or the second Access Router AR2 registers its own address as new Care-of-Address, which is similar to the Proxy Mobile IP protocol. In the latter case, the second Access Router AR2 sends a Binding Update BU message to the Home Agent HA with its own address as the new Care-of-Address. The advantage of keeping the first IP address CoA1 of the Mobile Node MN unchanged relies in that the Mobile Node MN does not need to support the Mobile IPv6 protocol.

FIG. 4 shows the format of a Router Advertisement RA message according to an embodiment of the invention. The Router Advertisement RA message contains a prefix information option with the prefix of an Access Router. In particular, in the procedures shown in FIGS. 2 and 3, the second Access Router AR2 sends a Router Advertisement RA message containing the prefix of the first access router AR1 (prefix1), thereby postponing the layer 3 handover procedure.

The destination address in the IP header of the Router Advertisement RA message can be the all-nodes multicast address or the unicast address of the Mobile Node MN, such as e.g. the first IP address CoA1. In the former case, the A-bit in the prefix information option should be unset to prevent other nodes from configuring an address for the first prefix (prefix1) of the Mobile Node MN. Furthermore, the L-bit should be set to zero in order to force all packets sent by the Mobile Node MN to go over the second Access Router AR2, since otherwise other nodes having the first prefix (prefix1) and located at the first Access Router AR1 are still considered on-link after the handover. Since this may not be true, communication to those may break after the handover.

Another embodiment of the invention relates to the implementation of the above described various embodiments using hardware and software. It is recognized that the various embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Therefore, it is apparent to a person skilled in the art that a method for managing the movement of a mobile node moving from a first network to a second network according to the invention provides the following advantages. First, the layer 3 handover latency can be zero or close to zero, since the complete layer 3 handover procedure is moved out of the critical handover phase, i.e. it is rendered possible to perform data communication during the layer 3 handover. In fact, it is possible to postpone the layer 3 handover procedure, or even completely skip it, depending on the lifetimes of the subnet prefix belonging to the first network and transmitted in the router advertisement message by the second access router to the mobile node. The network can control when the Mobile Node shall do the layer 3 handover and register its new address as Care-of-Address.

Furthermore, no time is needed for layer 3 handover signalling before the layer 2 handover. The method according to the invention does not require handover prediction. The Mobile Node implementation does not need to be changed. The method according to the invention also generates less over-the-air signalling than methods known in the art. Finally, the area for mobility without IP address change is not limited, contrary to the NETLMM approach, where the movement of the mobile node is limited to the NETLMM domain.

The invention claimed is:

1. A method for managing the movement of a mobile node moving from a first network to a second network, wherein the mobile node communicates with a corresponding node by exchanging data packets, the data packets being routed by a first router and a second router, the first router and the second router being associated respectively with the first network and the second network, and said mobile node having a first IP address configured with a subnet prefix belonging to the first network, and wherein a second subnet prefix belongs to the second network, the second subnet prefix being different from the subnet prefix belonging to the first network, said method comprising the following steps:

receiving, by the first router, first information on a departure of the mobile node from the first network, setting, by the first router, upon receiving the first information, a first forwarding rule according to which data packets addressed to the first IP address of the mobile node are to be forwarded to at least one neighbouring router of the first router, the at least one neighbouring router being located in at least one neighbouring network of the first network, transmitting, by the first router, the subnet prefix of the first IP address of the mobile node to the at least one neighbouring router, receiving, by the second router, second information on an arrival of the mobile node in the second network, setting, by the second router, upon the arrival of the mobile node in the second network, a second forwarding rule according to which data packets addressed to the first IP address of the mobile node and arriving at the second router are to be delivered to the mobile node over a wireless network interface of the second router, and transmitting, by the second router, a router advertisement message over the wireless network interface to the mobile node, the router advertisement message comprising the subnet prefix of the first IP address.

2. The method according to claim 1, further comprising setting, by the second router, a prefix lifetime to a value that is larger than a minimum time necessary for the mobile node to complete a configuration of a second IP address having the second subnet prefix belonging to the second network, and transmitting the set prefix lifetime in the router advertisement message.

3. The method according to claim 2, further comprising configuring, by the mobile node, the second IP address while being located in the second network and receiving data packets addressed to the first IP address, and registering, by the mobile node, the configured second IP address at a mobility agent.

4. The method according to claim 1, further comprising setting, by the second router, a prefix lifetime to a value that is at least as high as a transmission interval between two consecutive router advertisement messages, and periodically transmitting, by the second router, the router advertisement message to the mobile node, the router advertisement message comprising the set prefix lifetime.

5. The method according to claim 4, wherein the mobile node moves successively from a previous network to a current network, a previous router and a current router being associated respectively with the previous network and current network, and said method further comprises transmitting, by the previous router, the subnet prefix of the first IP address to the current router.

6. The method according to claim 1, further comprising notifying, by the second router, the first router about the arrival of the mobile node in the second network, and updating, by the first router, upon notification from the second router, the first forwarding rule with a third forwarding rule according to which data packets addressed to the first IP address of the mobile node and arriving at the first router are to be forwarded to the second router.

7. The method according to claim 1, further comprising storing, by the at least one neighbouring router, data packets addressed to the first IP address of the mobile node, and transmitting, by the second router, the stored data packets to the mobile node over the wireless network interface according to the set second forwarding rule.

8. The method according to claim 1, further comprising transmitting, by the first router, a layer 2 address of the mobile node to the at least one neighbouring router, and wherein the step of receiving the first information on the departure of the mobile node from the first network comprises receiving, by the first router, information on the mobile node starting a layer 2 handover for the transmitted layer 2 address of the mobile node, and the step of receiving the second information on the arrival of the mobile node in the second network comprises receiving, by the second router, information on the mobile node terminating the layer 2 handover for the transmitted layer 2 address of the mobile node.

9. The method according to claim 1, further comprising transmitting, by the second router, upon the arrival of the mobile node in the second network, a redirect message to the mobile node comprising an IP address of the second router and an indication for the mobile node to send data packets over the second router.

10. The method according to claim 9, further comprising transmitting, by the first router, an IP address of the first router to the second router, and the redirect message transmitted to the mobile node further comprises the IP address of the second router as a target address and the received IP address of the first router as a source address, the mobile node thereby updating, upon reception of the redirect message, a default router from the first router to the second router.

11. The method according to claim 9, further comprising transmitting, by the second router, the redirect message to the mobile node upon receiving, by the second router, data packets sent by the mobile node that are addressed to an IP address of the first router.

12. The method according to claim 10, further comprising transmitting, by the second router, the redirect message to the mobile node upon receiving, by the second router, data packets sent by the mobile node that are addressed to the IP address of the first router.

13. A method for managing the movement of a mobile node moving from a first network to a second network, wherein the mobile node communicates with a corresponding node by exchanging data packets, the data packets being routed by a first router and a second router, the first router and the second router being associated respectively with the first network and the second network, and said mobile node having a first IP address configured with a subnet prefix belonging to the first network, and wherein a second subnet prefix belongs to the second network, the second subnet prefix being different from the subnet prefix belonging to the first network, said method comprising the following steps:
receiving, by the first router, first information on a departure of the mobile node from the first network,
transmitting, by the first router, the subnet prefix of the first IP address of the mobile node to at least one neighbouring router of the first router, the at least one neighbouring router being located in at least one neighbouring network of the first network,
receiving, by the second router, second information on an arrival of the mobile node in the second network,
transmitting, by the second router, upon the arrival of the mobile node in the second network, an indication to the mobile node to use the second router as a default router,
setting, by the second router, a forwarding rule according to which data packets sent by the mobile node over a wireless network interface and arriving at the second router are to be transmitted to the first router, and
transmitting, by the second router, a router advertisement message over the wireless network interface to the mobile node, the router advertisement message comprising the subnet prefix of the first IP address.

14. The method according to claim 13, further comprising setting, by the second router, a prefix lifetime to a value that is larger than a minimum time necessary for the mobile node to complete a configuration of a second IP address having the second subnet prefix belonging to the second network, and transmitting the set prefix lifetime in the router advertisement message.

15. The method according to claim 14, further comprising configuring, by the mobile node, the second IP address while being located in the second network and sending data packets with the first IP address, and registering, by the mobile node, the configured second IP address at a mobility agent.

16. The method according to claim 13, further comprising setting, by the second router, a prefix lifetime to a value that is at least as high as a transmission interval between two consecutive router advertisement messages, and periodically transmitting, by the second router, the router advertisement message to the mobile node, the router advertisement message comprising the set prefix lifetime.

17. The method according to claim 16, wherein the mobile node moves successively from a previous network to a current network, a previous router and current router being associated respectively with the previous network and current network, and said method further comprises transmitting, by the previous router, the subnet prefix of the first IP address to the current router.

18. The method according to claim 13, further comprising transmitting, by the first router, a layer 2 address of the mobile node to the at least one neighbouring router, and wherein the step of receiving the first information on the departure of the mobile node from the first network comprises receiving, by the first router, information on the mobile node starting a layer 2 handover for the transmitted layer 2 address of the mobile node, and the step of receiving the second information on the arrival of the mobile node in the second network comprises receiving, by the second router, information on the mobile node terminating the layer 2 handover for the transmitted layer 2 address of the mobile node.

19. The method according to claim 13, further comprising transmitting, by the second router, upon the arrival of the mobile node in the second network, a redirect message to the mobile node comprising an IP address of the second router and an indication for the mobile node to send data packets over the second router.

20. The method according to claim 19, further comprising transmitting, by the first router, an IP address of the first router to the second router, and the redirect message transmitted to the mobile node further comprises the IP address of the second router as a target address and the received IP address of the first router as a source address, the mobile node thereby updating, upon reception of the redirect message, a default router from the first router to the second router.

21. The method according to claim 19, further comprising transmitting, by the second router, the redirect message to the mobile node upon receiving, by the second router, data packets sent by the mobile node that are addressed to an IP address of the first router.

22. A communication system comprising a first router, a second router and a mobile node, the first router and the second router being associated respectively with a first network and a second network, wherein said communication system is configured to manage the movement of the mobile node moving from the first network to the second network, the first router and the second router are configured to route data packets exchanged by the mobile node with a corresponding node, said mobile node has a first IP address configured with a subnet prefix belonging to the first network, and wherein a second subnet prefix belongs to the second network, the second subnet prefix being different from the subnet prefix belonging to the first network, and the first router comprises:
a first receiving section to receive first information on a departure of the mobile node from the first network,
a first forwarding rule setting section to set, upon receiving the first information, a first forwarding rule according to which data packets addressed to the first IP address of the mobile node are to be forwarded to at least one neighbouring router of the first router, the at least one neighbouring router being located in at least one neighbouring network of the first network, and
a first transmitting section to transmit the subnet prefix of the first IP address of the mobile node to the at least one neighbouring router, and the second router comprises:
a second receiving section to receive second information on an arrival of the mobile node in the second network,
a second forwarding rule setting section to set, upon the arrival of the mobile node in the second network, a second forwarding rule according to which data packets addressed to the first IP address of the mobile node and arriving at the second router are to be delivered to the mobile node over a wireless network interface of the second router, and a second transmitting section to transmit a router advertisement message over the wireless network interface to the mobile node, the router advertisement message comprising the subnet prefix of the first IP address.

23. The communication system according to claim 22, wherein the second router further comprises a prefix lifetime setting section to set a prefix lifetime to a value that is larger than a minimum time necessary for the mobile node to complete a configuration of a second IP address having the second subnet prefix belonging to the second network, and the second transmitting section is further configured to transmit the set prefix lifetime in the router advertisement message.

24. The communication system according to claim 22, wherein the second router further comprises a prefix lifetime setting section to set a prefix lifetime to a value that is at least as high as a transmission interval between two consecutive router advertisement messages, and the second transmitting section is further configured to periodically transmit the router advertisement message to the mobile node, the router advertisement message comprising the set prefix lifetime.

25. The communication system according to claim 22, wherein the second router further comprises a notifying section to notify the first router about the arrival of the mobile node in the second network, and the first forwarding rule setting section is further configured to update, upon notification from the second router, the first forwarding rule with a third forwarding rule according to which data packets addressed to the first IP address of the mobile node and arriving at the first router are to be forwarded to the second router.

26. The communication system according to claim 22, wherein the first transmitting section is further configured to transmit a layer 2 address of the mobile node to the at least one neighbouring router, the first receiving section is further configured to receive information on the mobile node starting a layer 2 handover for the transmitted layer 2 address of the mobile node, and the second receiving section is further configured to receive information on the mobile node terminating the layer 2 handover for the transmitted layer 2 address of the mobile node.

27. The communication system according to claim 22, wherein the second transmitting section is configured to transmit, upon the arrival of the mobile node in the second network, a redirect message to the mobile node comprising an IP address of the second router and an indication for the mobile node to send data packets over the second router.

28. The communication system according to claim 27, wherein the first transmitting section is further configured to transmit an IP address of the first router to the second router, and the redirect message transmitted to the mobile node further comprises the IP address of the second router as a target address and the received IP address of the first router as a source address, the mobile node thereby updating, upon reception of the redirect message, a default router from the first router to the second router.

29. The communication system according to claim 27, wherein the second transmitting section is further configured to transmit the redirect message to the mobile node upon receiving, by the second router, data packets sent by the mobile node that are addressed to an IP address of the first router.

30. A communication system comprising a first router, a second router and a mobile node, the first router and the second router being associated respectively with a first network and a second network, wherein said communication system is configured to manage the movement of the mobile node moving from the first network to the second network, the first router and the second router are configured to route data packets exchanged by the mobile node with a corresponding node, and said mobile node has a first IP address configured with a subnet prefix belonging to the first network, and wherein a second subnet prefix belongs to the second network, the second subnet prefix being different from the subnet prefix belonging to the first network, and the first router comprises:
a first receiving section to receive first information on a departure of the mobile node from the first network, and
a first transmitting section to transmit the subnet prefix of the first IP address of the mobile node to at least one neighbouring router of the first router, the at least one neighbouring router being located in at least one neighbouring network of the first network, and the second router comprises:
a second receiving section to receive second information on an arrival of the mobile node in the second network,
a second forwarding rule setting section to set, upon the arrival of the mobile node in the second network, a forwarding rule according to which data packets sent by the mobile node over a wireless network interface and arriving at the second router are to be transmitted to the first router, and
a second transmitting section to transmit, upon the arrival of the mobile node in the second network, an indication to the mobile node to use the second router as a default router, and to transmit a router advertisement message over the wireless network interface to the mobile node, the router advertisement message comprising the subnet prefix of the first IP address.

31. The communication system according to claim 30, wherein the second router further comprises a prefix lifetime setting section to set a prefix lifetime to a value that is larger than a minimum time necessary for the mobile node to complete a configuration of a second IP address having the second subnet prefix belonging to the second network, and the second transmitting section is further configured to transmit the set prefix lifetime in the router advertisement message.

32. The communication system according to claim 30, wherein the second router further comprises a prefix lifetime setting section to set a prefix lifetime to a value that is at least as high as a transmission interval between two consecutive router advertisement messages, and the second transmitting section is further configured to periodically transmit the router advertisement message to the mobile node, the router advertisement message comprising the set prefix lifetime.

33. The communication system according to claim 30, wherein the first transmitting section is further configured to transmit a layer 2 address of the mobile node to the at least one neighbouring router, the first receiving section is further configured to receive information on the mobile node starting a layer 2 handover for the transmitted layer 2 address of the mobile node, and the second receiving section is further configured to receive information on the mobile node terminating the layer 2 handover for the transmitted layer 2 address of the mobile node.

34. The communication system according to claim 30, wherein the second transmitting section is configured to transmit, upon the arrival of the mobile node in the second network, a redirect message to the mobile node comprising an IP address of the second router and an indication for the mobile node to send data packets over the second router.

35. The communication system according to claim 34, wherein the first transmitting section is further configured to transmit an IP address of the first router to the second router, and the redirect message transmitted to the mobile node further comprises the IP address of the second router as a target address and the received IP address of the first router as a source address, the mobile node thereby updating, upon reception of the redirect message, a default router from the first router to the second router.

36. The communication system according to claim 34, wherein the second transmitting section is further configured to transmit the redirect message to the mobile node upon receiving, by the second router, data packets sent by the mobile node that are addressed to an IP address of the first router.

37. The communication system according to claim 35, wherein the second transmitting section is further configured to transmit the redirect message to the mobile node upon receiving, by the second router, data packets sent by the mobile node that are addressed to the IP address of the first router.

* * * * *